(12) United States Patent
Liu et al.

(10) Patent No.: US 11,894,705 B2
(45) Date of Patent: Feb. 6, 2024

(54) INDICATING CHARGE STATUS

(71) Applicant: Hand Held Products, Inc., Charlotte, NC (US)

(72) Inventors: Jiaqi Liu, Jiangsu (CN); Janna Yu, Jiangsu (CN); Lei Wang, Jiangsu (CN); Larry Ramsey-Macomber, Fairport, NY (US); Stephen J. Colavito, Garnet Valley, PA (US); Derrick Cheng, Jiangsu (CN); Charles Joseph Cunningham, IV, Broomall, PA (US); Ka Man Au, Philadelphia, PA (US); Joseph Livingston, Camillus, NY (US); HongJian Jin, Jiangsu (CN); David Wilz, Sr., Sewell, NJ (US); Gavin Di, Jiangsu (CN)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 29 days.

(21) Appl. No.: 17/139,688

(22) Filed: Dec. 31, 2020

(65) Prior Publication Data
US 2021/0126479 A1    Apr. 29, 2021

Related U.S. Application Data

(63) Continuation of application No. 15/869,844, filed on Jan. 12, 2018, now Pat. No. 10,897,150.

(51) Int. Cl.
*H02J 7/00* (2006.01)
*G06K 7/14* (2006.01)
*H02J 7/34* (2006.01)

(52) U.S. Cl.
CPC .......... *H02J 7/0044* (2013.01); *G06K 7/1413* (2013.01); *H02J 7/0048* (2020.01);
(Continued)

(58) Field of Classification Search
CPC ........................................................ H02J 7/00
See application file for complete search history.

(56) References Cited

U.S. PATENT DOCUMENTS

| 5,164,652 A | 11/1992 | Johnson et al. |
| 5,939,856 A | 8/1999 | Demuro et al. |

(Continued)

FOREIGN PATENT DOCUMENTS

| AU | 2005211521 A1 | 3/2006 |
| WO | 2013/163789 A1 | 11/2013 |

OTHER PUBLICATIONS

US 8,548,242 B1, 10/2013, Longacre (withdrawn)
(Continued)

*Primary Examiner* — Robert Grant
(74) *Attorney, Agent, or Firm* — Alston & Bird LLP

(57) ABSTRACT

Charging/recharging systems and charge status indicators are provided. In one implementation, a charge status indicator includes a charge sensing device configured to sense the charge of a rechargeable power supply. The charge status indicator further includes a detection device configured to compare the sensed charge with a plurality of predetermined levels in order to determine one of a plurality of capacity ranges of the rechargeable power supply. The charge status indicator also includes a first light emitting diode (LED), a second LED, and a switching circuit configured to switch the first and second LEDs on and off using a plurality of predefined illumination patterns to indicate the capacity range of the rechargeable power supply.

20 Claims, 4 Drawing Sheets

(52) U.S. Cl.
CPC ........... *H02J 7/0047* (2013.01); *H02J 7/0049* (2020.01); *H02J 7/345* (2013.01)

(56) References Cited

U.S. PATENT DOCUMENTS

| | | | |
|---|---|---|---|
| 6,222,343 B1 | 4/2001 | Crisp et al. |
| 6,832,725 B2 | 12/2004 | Gardiner et al. |
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,639,019 B2 | 12/2009 | Bosse et al. |
| 7,726,575 B2 | 6/2010 | Wang et al. |
| 8,044,815 B2 | 10/2011 | Du et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Van et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein, Jr. |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre, Jr. |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz, Sr. |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |

(56) References Cited

U.S. PATENT DOCUMENTS

| | | |
|---|---|---|
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,082,031 B2 | 7/2015 | Liu et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| D737,321 S | 8/2015 | Lee |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham, IV |
| 9,135,483 B2 | 9/2015 | Lu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein, Jr. |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,203,992 B2 | 12/2015 | Ohhashi |
| 9,208,366 B2 | 12/2015 | Liu |
| 9,208,367 B2 | 12/2015 | Smith |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| D754,205 S | 4/2016 | Nguyen et al. |
| D754,206 S | 4/2016 | Nguyen et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| 9,319,548 B2 | 4/2016 | Showering et al. |
| D757,009 S | 5/2016 | Oberpriller et al. |
| 9,342,723 B2 | 5/2016 | Liu et al. |
| 9,342,724 B2 | 5/2016 | Mccloskey et al. |
| 9,360,304 B2 | 6/2016 | Xue et al. |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,383,848 B2 | 7/2016 | Daghigh |
| 9,384,374 B2 | 7/2016 | Bianconi |
| 9,390,304 B2 | 7/2016 | Chang et al. |
| 9,390,596 B1 | 7/2016 | Todeschini |
| D762,604 S | 8/2016 | Fitch et al. |
| 9,411,386 B2 | 8/2016 | Sauerwein, Jr. |
| 9,412,242 B2 | 8/2016 | Van et al. |
| 9,418,269 B2 | 8/2016 | Havens et al. |

(56) References Cited

U.S. PATENT DOCUMENTS

| | | |
|---|---|---|
| 9,418,270 B2 | 8/2016 | Van et al. |
| 9,423,318 B2 | 8/2016 | Liu et al. |
| 9,424,454 B2 | 8/2016 | Tao et al. |
| D766,244 S | 9/2016 | Zhou et al. |
| 9,436,860 B2 | 9/2016 | Smith et al. |
| 9,443,123 B2 | 9/2016 | Hejl |
| 9,443,222 B2 | 9/2016 | Singel et al. |
| 9,454,689 B2 | 9/2016 | Mccloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,487,113 B2 | 11/2016 | Schukalski |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Arjen |
| 9,697,401 B2 | 7/2017 | Feng et al. |
| 9,701,140 B1 | 7/2017 | Alaganchetty et al. |
| 2006/0061332 A1 | 3/2006 | Neu et al. |
| 2006/0192015 A1 | 8/2006 | DiGiovanna |
| 2007/0063048 A1 | 3/2007 | Havens et al. |
| 2008/0185432 A1 | 8/2008 | Caballero et al. |
| 2009/0134221 A1 | 5/2009 | Zhu et al. |
| 2010/0134072 A1 | 6/2010 | Neu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0265880 A1 | 10/2010 | Rautiola et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0116379 A1 | 5/2012 | Yates et al. |
| 2012/0168511 A1 | 7/2012 | Kotlarsky et al. |
| 2012/0168512 A1 | 7/2012 | Kotlarsky et al. |
| 2012/0193423 A1 | 8/2012 | Samek |
| 2012/0194692 A1 | 8/2012 | Mers et al. |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0277431 A1* | 10/2013 | DiGiovanna ...... G06K 7/10881 235/462.42 |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Affargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2013/0332996 A1 | 12/2013 | Fiala et al. |
| 2014/0001267 A1 | 1/2014 | Giordano et al. |
| 2014/0002828 A1 | 1/2014 | Laffargue et al. |
| 2014/0025584 A1 | 1/2014 | Liu et al. |
| 2014/0034734 A1 | 2/2014 | Sauerwein, Jr. |
| 2014/0036848 A1 | 2/2014 | Pease et al. |
| 2014/0038124 A1 | 2/2014 | Gill et al. |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0097249 A1 | 4/2014 | Gomez et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | Mccloskey et al. |
| 2014/0104414 A1 | 4/2014 | Mccloskey et al. |
| 2014/0104416 A1 | 4/2014 | Giordano et al. |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0191684 A1 | 7/2014 | Valois |
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | Digregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0332590 A1 | 11/2014 | Wang et al. |

(56) References Cited

U.S. PATENT DOCUMENTS

| | | |
|---|---|---|
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0039878 A1 | 2/2015 | Barten |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0178523 A1 | 6/2015 | Gelay et al. |
| 2015/0178537 A1 | 6/2015 | El et al. |
| 2015/0178685 A1 | 6/2015 | Krumel et al. |
| 2015/0181109 A1 | 6/2015 | Gillet et al. |
| 2015/0186703 A1 | 7/2015 | Chen et al. |
| 2015/0199957 A1 | 7/2015 | Funyak et al. |
| 2015/0210199 A1 | 7/2015 | Payne |
| 2015/0212565 A1 | 7/2015 | Murawski et al. |
| 2015/0213647 A1 | 7/2015 | Laffargue et al. |
| 2015/0220753 A1 | 8/2015 | Zhu et al. |
| 2015/0220901 A1 | 8/2015 | Gomez et al. |
| 2015/0227189 A1 | 8/2015 | Davis et al. |
| 2015/0236984 A1 | 8/2015 | Sevier |
| 2015/0239348 A1 | 8/2015 | Chamberlin |
| 2015/0242658 A1 | 8/2015 | Nahill et al. |
| 2015/0248572 A1 | 9/2015 | Soule et al. |
| 2015/0254485 A1 | 9/2015 | Feng et al. |
| 2015/0261643 A1 | 9/2015 | Caballero et al. |
| 2015/0264624 A1 | 9/2015 | Wang et al. |
| 2015/0268971 A1 | 9/2015 | Barten |
| 2015/0269402 A1 | 9/2015 | Barber et al. |
| 2015/0288689 A1 | 10/2015 | Todeschini et al. |
| 2015/0288896 A1 | 10/2015 | Wang |
| 2015/0310243 A1 | 10/2015 | Ackley et al. |
| 2015/0310244 A1 | 10/2015 | Xian et al. |
| 2015/0310389 A1 | 10/2015 | Crimm et al. |
| 2015/0312780 A1 | 10/2015 | Wang et al. |
| 2015/0327012 A1 | 11/2015 | Bian et al. |
| 2016/0014251 A1 | 1/2016 | Hejl |
| 2016/0025697 A1 | 1/2016 | Alt et al. |
| 2016/0026838 A1 | 1/2016 | Gillet et al. |
| 2016/0026839 A1 | 1/2016 | Qu et al. |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0070944 A1 | 3/2016 | Mccloskey et al. |
| 2016/0092805 A1 | 3/2016 | Geisler et al. |
| 2016/0099581 A1* | 4/2016 | Kawamura ............ H02J 7/0003 320/107 |
| 2016/0101936 A1 | 4/2016 | Chamberlin |
| 2016/0102975 A1 | 4/2016 | Mccloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171597 A1 | 6/2016 | Todeschini |
| 2016/0171666 A1 | 6/2016 | Mccloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | Mcmahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Franz |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini et al. |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | Dipiazza et al. |
| 2016/0192051 A1 | 6/2016 | Dipiazza et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggerty et al. |
| 2016/0204636 A1 | 7/2016 | Allen et al. |
| 2016/0204638 A1 | 7/2016 | Miraglia et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz et al. |
| 2016/0314294 A1 | 10/2016 | Kubler et al. |
| 2016/0316190 A1 | 10/2016 | Mccloskey et al. |
| 2016/0323310 A1 | 11/2016 | Todeschini et al. |
| 2016/0325677 A1 | 11/2016 | Fitch et al. |

(56) References Cited

U.S. PATENT DOCUMENTS

| | | |
|---|---|---|
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0012448 A1 * | 1/2017 | Miller .................. H02J 7/0029 |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Germaine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress, Jr. |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | Mccloskey et al. |
| 2017/0126873 A1 | 5/2017 | Mcgary et al. |
| 2017/0126904 A1 | 5/2017 | D'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Celinder et al. |
| 2017/0193727 A1 | 7/2017 | Van et al. |
| 2017/0199266 A1 | 7/2017 | Rice et al. |
| 2017/0200108 A1 | 7/2017 | Au et al. |
| 2017/0200275 A1 | 7/2017 | Mccloskey et al. |

OTHER PUBLICATIONS

US 8,616,454 B2, 12/2013, Havens et al. (withdrawn)
Advisory Action (PTOL-303) dated Apr. 23, 2020 for U.S. Appl. No. 15/869,844.
Final Rejection dated Feb. 18, 2020 for U.S. Appl. No. 15/869,844.
Non-Final Rejection dated Nov. 5, 2019 for U.S. Appl. No. 15/869,844.
Notice of Allowance and Fees Due (PTOL-85) dated Jul. 29, 2020 for U.S. Appl. No. 15/869,844.
Notice of Allowance and Fees Due (PTOL-85) dated May 29, 2020 for U.S. Appl. No. 15/869,844.
Notice of Allowance and Fees Due (PTOL-85) dated Sep. 18, 2020 for U.S. Appl. No. 15/869,844.

* cited by examiner

| Indicator | STATUS | | | | | |
|---|---|---|---|---|---|---|
| | Scanner Absent | Charging Error | Near Empty | Ready to Use | Half Capacity | Near Full Capacity |
| LED #1 | off | H 300ms L 300ms | H 500ms L 500ms | off | off | off |
| LED #2 | off | H 300ms L 300ms | off | H 500ms L 500ms | H 1 sec L 500ms | on |

INDICATING CHARGE STATUS

CROSS-REFERENCE TO RELATED APPLICATIONS

This application is a continuation of U.S. application Ser. No. 15/869,844, filed Jan. 12, 2018, the entire contents of which are incorporated herein by reference.

FIELD OF THE INVENTION

The present invention relates to portable electronic devices and more particularly relates to devices for indicating the charge status of rechargeable power supplies used for powering the portable electronic devices.

BACKGROUND

Generally speaking, portable electronic devices are included in many aspects of everyday life. Examples of some portable electronic devices may include cell phones, wireless landline telephones, electric razors, calculators, wireless computer peripherals, radios, flashlights, wireless barcode scanners, just to name a few. Typically, these portable devices are powered by primary cell (non-rechargeable) batteries or secondary cell (rechargeable) batteries.

Although rechargeable batteries are normally a better economic choice than primary cell batteries and add less toxic waste to landfills, other power sources are available for powering portable electronic devices. For example, supercapacitors are a battery-free alternative that provides many advantages over conventional batteries.

Although supercapacitors do not hold a charge for as long as batteries, supercapacitors are able to be charged or recharged much faster than rechargeable batteries. Also, supercapacitors can be discharged and recharged hundreds of thousands of times without losing their charging capacity. On the other hand, rechargeable batteries may only be able to be discharged and recharged a few hundred times before their charging capacity declines to a point of no longer being usable.

Another advantage is that supercapacitors do not degrade like rechargeable batteries and therefore may never need to be replaced. Also, since there are no chemical reactions involved in the charging and discharging of supercapacitors, there is therefore no decay of chemical materials. Thus, supercapacitors can eliminate the environmental issues associated with the use and disposal of primary cell batteries and rechargeable batteries.

Because of the familiarity with rechargeable batteries, many users may have become accustomed to the practice of charging, discharging, and recharging of rechargeable batteries. Particularly, users may be aware that charging batteries before a first use may take hours and that recharging the batteries may take 10-30 minutes, depending on the type of batteries being used. Therefore, a user might repeatedly check the status of the battery charging process until the batteries are eventually ready to be used. Typically, there may be a single indicator for indicating that the rechargeable batteries are ready to be used.

However, since supercapacitors are charged, discharged, and recharged much faster than batteries, a new type of charge status indication process would be beneficial for users. Therefore, a need exists for a charge status indicator for indicating more information regarding the charge of a rechargeable power supply, particularly a rechargeable supercapacitor. In this way, a user can be informed of the various stages of charge status levels of the supercapacitors.

SUMMARY

Accordingly, in one aspect, the present invention embraces systems, devices, and methods for indicating the charge status of power supplies used for providing power to portable electronic devices. In particular, with the advent of new power supply technologies, such as supercapacitors, that are now being used in common electronic devices, charge status can be indicated to the user in a faster way and in a way that expresses more information than what is typically provided.

In an exemplary embodiment, a charging system is provided. The charging system includes a handheld electronic device having a rechargeable power supply and a base charger configured to support the handheld electronic device during a charging stage. The base charger is configured to provide electric charge to the handheld electronic device during the charging stage to recharge the rechargeable power supply. The charging system further includes a charge sensor configured to sense the charge of the rechargeable power supply and a detection device configured to compare the sensed charge of the rechargeable power supply with a plurality of predetermined charge levels in order to determine one of a plurality of capacity ranges of the rechargeable power supply. The charging system also includes a charge status indicator comprises first and second light emitting diodes (LEDs) and a switching circuit. The switching circuit of the charge status indicator is configured to switch the first and second LEDs according to one of a plurality of predefined illumination patterns to indicate a capacity range of the rechargeable power supply corresponding to the capacity range determined by the detection device.

In another exemplary embodiment, a recharging device is provided. In this embodiment, the recharging device comprises a charging cradle configured to support a handheld electronic device during a charging stage. The charging cradle is configured to supply electric power to the handheld electronic device during the charging stage to recharge a supercapacitor of the handheld electronic device. The recharging device also includes a charge status indicator comprising first and second light emitting diodes (LEDs) and a control circuit. Also, the recharging device includes a sensor configured to continuously sense the charge of the supercapacitor to determine one of a plurality of capacity ranges of the supercapacitor. The control circuit of the charge status indicator is configured to switch the first and second LEDs on and off using a plurality of predefined illumination patterns to indicate the capacity range of the supercapacitor determined by the sensor.

In yet another exemplary embodiment, a charge status indicator includes a charge sensing device configured to sense the charge of a rechargeable power supply and a detection device configured to compare the sensed charge with a plurality of predetermined levels in order to determine one of a plurality of capacity ranges of the rechargeable power supply. The charge status indicator further includes a first light emitting diode (LED), a second LED, and a switching circuit configured to switch the first and second LEDs on and off using a plurality of predefined illumination patterns to indicate the capacity range of the rechargeable power supply.

The foregoing illustrative summary, as well as other exemplary objectives and/or advantages of the invention,

DETAILED DESCRIPTION

The present invention embraces charging systems for charging and/or recharging a rechargeable power supply. In particular, the rechargeable power supplies described in the present disclosure may include supercapacitors in place of conventional rechargeable batteries. Furthermore, the present invention is directed to charge status indicators and other systems for indicating the charge status of the rechargeable power supply or supercapacitors.

Figure 1:
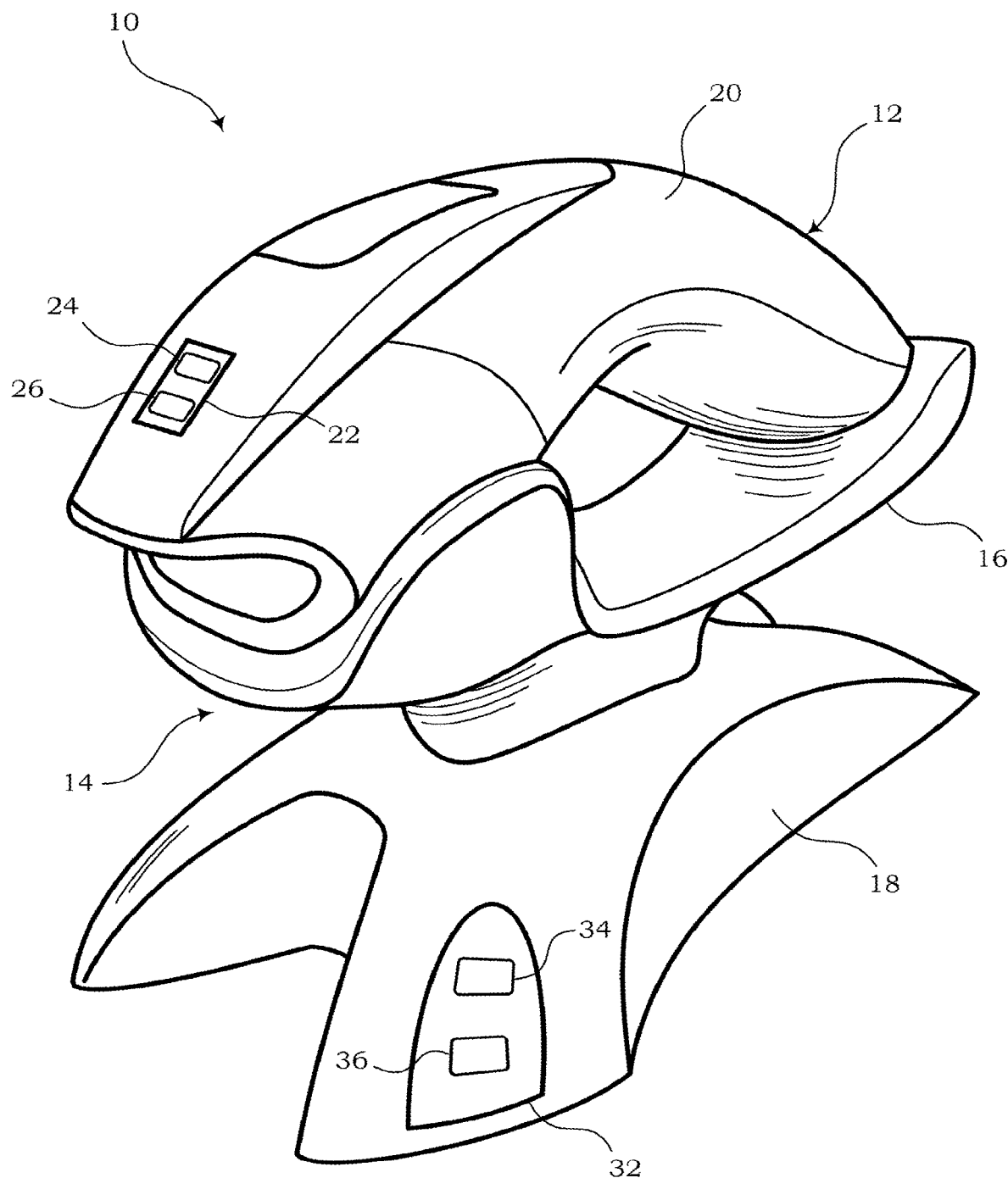
FIG. 1 schematically depicts a perspective view of a charging system according to an embodiment of the present invention.

FIG. 1 is a perspective view of an embodiment of a charging system 10. In this embodiment, the charging system 10 includes a wireless electronic device 12 and a recharging device 14. The wireless electronic device 12 may be a handheld device, such as a wireless barcode scanner or laser scanner. In other embodiments, the wireless electronic device 12 may include other types of portable devices, such as wireless landline telephones, electric razors, calculators, flashlights, etc.

The recharging device 14 in the embodiment of FIG. 1 includes a cradle 16 and a base 18. The cradle 16 may be designed to support the wireless electronic device 12 and may include electrical contacts (not shown) for making electrical connection with the wireless electronic device 12. In this manner, electrical power can be provided to the wireless electronic device 12 from the cradle 16 to charge or recharge a rechargeable power supply (not shown) attached externally to a housing 20 of the wireless electronic device 12 or disposed inside the housing 20 of the wireless electronic device 12. The rechargeable power supply may include one or more supercapacitors.

In some embodiments, the wireless electronic device 12 may include a charge status indicator 22 for indicating the charge status of the rechargeable power supply. As shown, the charge status indicator 22 may include a first indicator 24 and a second indicator 26. The first and second indicators 24, 26 may be light emitting diodes (LEDs). According to other embodiments, a second charge status indicator 32 may be incorporated in the base 18. The second charge status indicator 32 may also include a first indicator (e.g., LED) 34 and a second indicator (e.g., LED) 36.

The first and second indicators 24, 26 of the charge status indicator 22 may be positioned in two different locations, as shown, to give the appearance of separate indicators. In an alternative embodiment, the indicators 24, 26 may be located under an opaque window to give the appearance of the same indicator providing two (or more) different colors of light. With an opaque or semi-opaque window, a user would perceive that the light may be coming from the same location and may not notice the difference in the locations of the yellow and green LEDs. Likewise, the first and second indicators 34, 36 of the charge status indicator 32 may also be positioned in different locations (as shown) or under the same opaque window to give the perception of the same location with different colors.

One embodiment may include incorporating the charge status indicator 22 only on the wireless electronic device 12. A second embodiment may include incorporating the charge status indicator 32 only on the base 18. A third embodiment may include incorporating the two charge status indicators 22, 32 on both the wireless electronic device 12 and base 18, respectively.

According to the embodiment of FIG. 1, the base 18 of the recharging device 14 may be configured to hold the cradle 16 above a surface to enable a user to easily engage the wireless electronic device 12 with the cradle 16. Also, the base 18 may include a power cord (not shown) that can be plugged into an electrical outlet, allowing power to be supplied from the outlet to the charging system 10 for charging the rechargeable power supply of the wireless electronic device 12.

Figure 2:
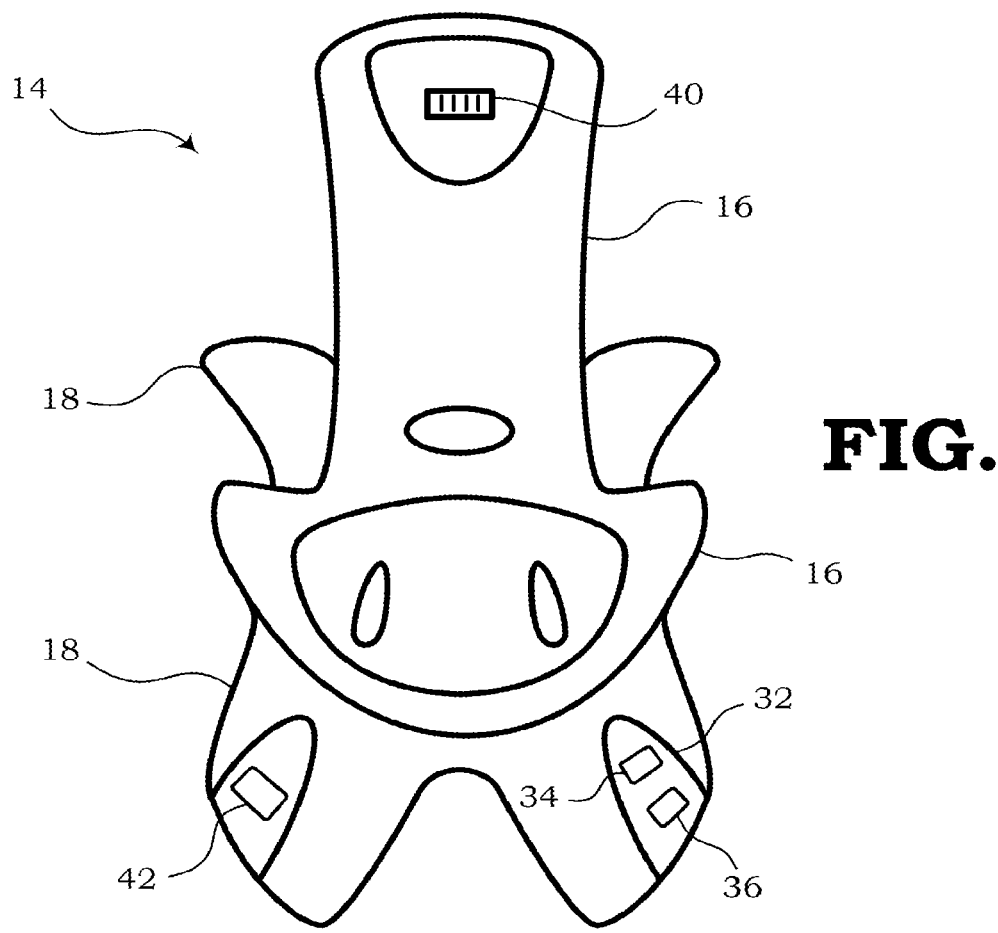
FIG. 2 schematically depicts a top view of the recharging device shown in FIG. 1 according to an embodiment of the present invention.

FIG. 2 is a top view of an embodiment of the recharging device 14 shown in FIG. 1 with the wireless electronic device 12 removed. In addition to the elements described with respect to FIG. 1, the cradle 16 of the recharging device 14 further comprises electrical contacts 40 for communicating with the wireless electronic device 12 when it is properly seated in the cradle 16. The electrical contacts 40 are configured to provide power to the wireless electronic device 12 for recharging the rechargeable power supply. The electrical contacts 40 are also configured to communicate charge status information from the wireless electronic device 12 to the recharging device 14, particularly with respect to embodiments in which the recharging device 14 includes the charge status indicator 32. The electrical contacts 40 may also be configured to electrically communicate other signals as needed.

The recharging device 14 may further include a power indicator 42 incorporated on the base 18. The power indicator 42 may be configured to indicate when power is being supplied to the recharging device 14 from the electrical outlet allowing the recharging device 14 to properly charge or recharge the rechargeable power supply of the wireless electronic device 12.

Figure 3:
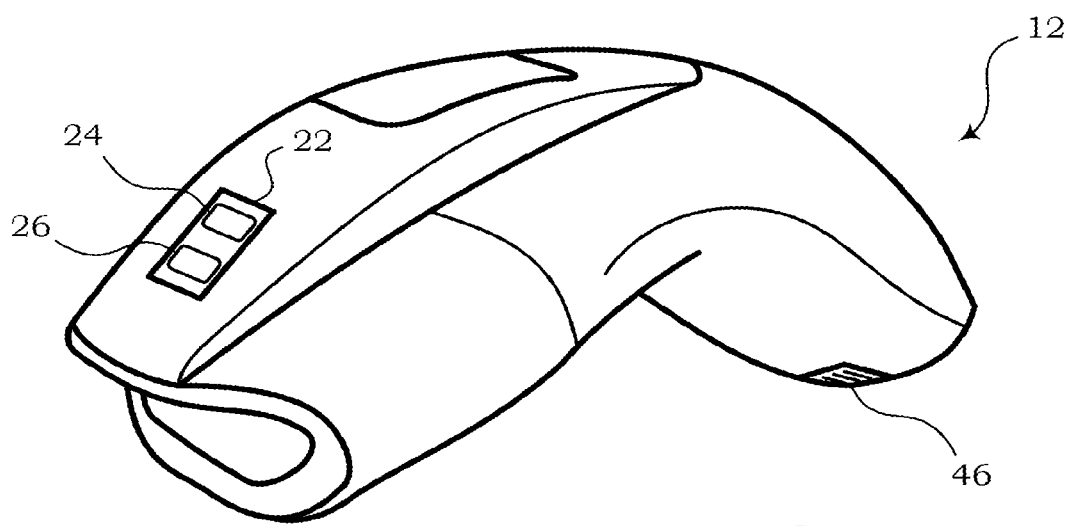
FIG. 3 schematically depicts a perspective view of the portable electronic device shown in FIG. 1 according to an embodiment of the present invention.

FIG. 3 is a perspective view of an embodiment of the wireless electronic device 12 shown in FIG. 1. For example, the wireless electronic device 12 may be a wireless barcode scanner. In addition to the features shown and described with respect to FIG. 1, the wireless electronic device 12 may further include contacts 50 configured for making electrical connection with the electrical contacts 40 of the cradle 16 (FIG. 2). Therefore, when the wireless electronic device 12 is properly seated or nested on the cradle 16, the contacts 50 are configured to touch the electrical contacts 40 of the cradle 16. As mentioned above, when the contacts 40, 50 are connected, electrical power can be provided to the rechargeable power supply as needed for charging or recharging the rechargeable power supply. Also, other communication signals may be shared between the wireless electronic device 12 and the recharging device 14 via the contacts 40, 50.

Therefore, according to one implementation, the charging system 10 (FIGS. 1-3) comprises a handheld electronic device (e.g., wireless electronic device 12) having a rechargeable power supply. The charging system 10 also includes a base charger or recharging device 14 configured to support the handheld electronic device during a charging stage. A charge status indicator (e.g., one or both of charge status indicators 22, 32) comprises first and second LEDs (e.g., LEDs 24, 26 or LEDs 34, 36) and a switching circuit. The base charger is configured to provide electric charge to the handheld electronic device during the charging stage to recharge the rechargeable power supply of the handheld electronic device. The charge status indicator 22, 32 comprises a charge sensor for sensing the charge of the rechargeable power supply. The charge status indicator 22, 32 further comprises a detection device configured to compare the sensed charge of the rechargeable power supply with a plurality of predetermined charge levels in order to determine one of a plurality of capacity ranges of the rechargeable power supply. The switching circuit of the charge status indicator 22, 32 is configured to switch the first and second LEDs (e.g., LEDs 24, 26 or LEDs 34, 36) on and off in one of a plurality of predefined illumination patterns (or on/off patterns) to indicate a capacity range of the rechargeable power supply corresponding to the capacity range determined by the detection device.

In some embodiments, the charge status indicator 32 is incorporated in the base charger (e.g., recharging device 14). In another embodiment, the charge status indicator 22 is incorporated in the handheld electronic device. Specifically, the rechargeable power supply may include at least one supercapacitor. The handheld electronic device may be a wireless barcode scanner.

The plurality of capacity ranges may include a first range designating a "near empty" status, a second range designating a "ready to use" status, a third range designating a "greater than half capacity" status, and a fourth range designating an "at or near full capacity" status. The switching circuit may be configured to switch the first and second LEDs in a first predefined illumination pattern (or on/off pattern) when the charge of the rechargeable power supply falls within the first range, a second predefined illumination pattern when the charge of the rechargeable power supply falls within the second range, a third predefined illumination pattern when the charge of the rechargeable power supply falls within the third range, and a fourth predefined illumination pattern when the charge of the rechargeable power supply falls within the fourth range. In particular, the first predefined illumination pattern may include repeating a cycle of switching the first LED on for about 500 ms and off for about 500 ms. The second predefined illumination pattern may include repeating a cycle of switching the second LED on for about 500 ms and off for about 500 ms. The third predefined illumination pattern may include repeating a cycle of switching the second LED on for about 1000 ms and off for about 500 ms. Also, the fourth predefined illumination pattern may include switching the second LED on.

In one example, the first LED may be a yellow LED and the second LED may be a green LED. The switching circuit may be configured to switch the first and second LEDs off when the base charger is not charging the rechargeable power supply or when the handheld electronic device is not properly supported by the base charger. Furthermore, the switching circuit may be configured to switch at least one of the first and second LEDs in a rapid on/off pattern when at least one of the charge sensor and detection device detects a charging error or a condition in which the charging has been suspended.

Figure 4:
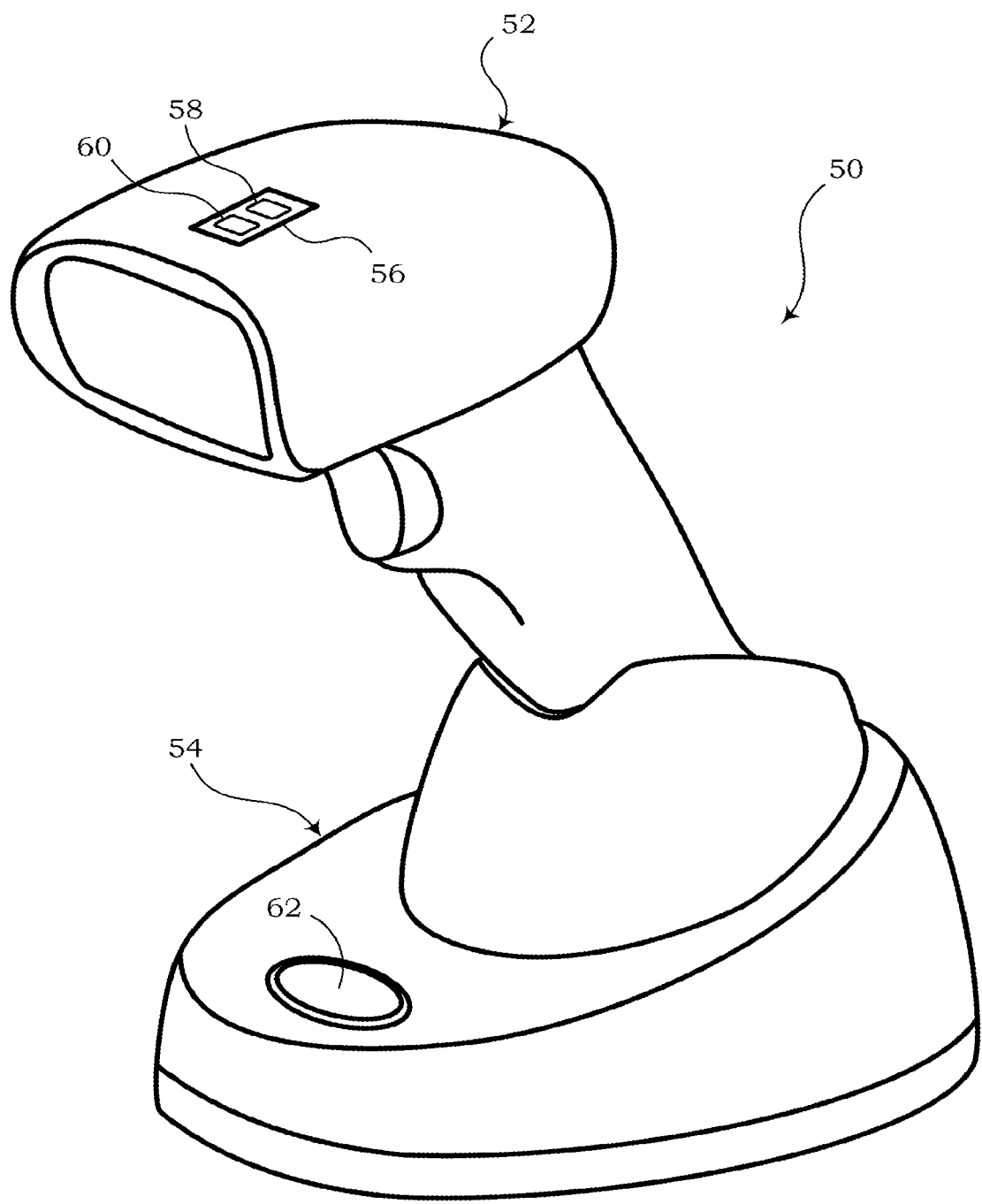
FIG. 4 schematically depicts a perspective view of a charging system according to a second embodiment of the present invention.

FIG. 4 is a perspective view of a second embodiment of a charging system 50. In this embodiment, the charging system 50 includes a wireless electronic device 52 and a recharging device 54. The wireless electronic device 52 may be a handheld device, such as a wireless barcode scanner or laser scanner. In other embodiments, the wireless electronic device 52 may include other types of portable devices, such as wireless landline telephones, electric razors, calculators, flashlights, etc.

The recharging device 54 in the embodiment of FIG. 4 includes a base that acts as a cradle for supporting the wireless electronic device 52 during charging. The recharging device 54 may be designed to support the wireless electronic device 52 and may include electrical contacts (not shown) for making electrical connection with the wireless electronic device 52. In this manner, electrical power can be provided to the wireless electronic device 52 from the recharging device 54 to charge or recharge a rechargeable power supply (not shown) attached externally to the wireless electronic device 52 or disposed inside a housing of the wireless electronic device 52. The rechargeable power supply may include one or more supercapacitors.

In some embodiments, the wireless electronic device 52 may include a charge status indicator 56 for indicating the charge status of the rechargeable power supply. As shown, the charge status indicator 56 may include a first indicator 58 and a second indicator 60. The first and second indicators 58, 60 may be light emitting diodes (LEDs). According to other embodiments, a second charge status indicator 62 may be incorporated in the recharging device 54. The second charge status indicator 62 may also include first and second LEDs.

One embodiment may include incorporating the charge status indicator 56 only on the wireless electronic device 52. A second embodiment may include incorporating the charge status indicator 62 only on the recharging device 54. A third embodiment may include incorporating the two charge status indicators 56, 62 on both the wireless electronic device 52 and recharging device 54, respectively.

According to the embodiment of FIG. 4, the recharging device 54 may be configured to support the wireless electronic device 52 in an upright manner. Also, the recharging device 54 may include a power cord (not shown) that can be plugged into an electrical outlet, allowing power to be supplied from the outlet to the charging system 50 for charging the rechargeable power supply of the wireless electronic device 52.

The charge status indicator 62 may be built into an oval page button that may be used for paging the wireless electronic device 52. The oval page button may include an opaque or semi-opaque material through which light from one or more indicators may be diffused. One side (e.g., the left side) of the oval page button may comprise the charge status indicator 62, which may include a first indicator (e.g., a green LED) and a second indicator (e.g., a yellow LED) underneath the opaque or semi-opaque material. The user may perceive the color change when one or the other of the indicators is illuminated, but may not necessarily notice the change in the location of the indicators underneath the button. In some embodiments, the other side (e.g., the right side) of the oval page button may include a third indicator (e.g., a red LED) used for other indications, such as a "power on" indication or a paging operation.

Figures 5, 6:
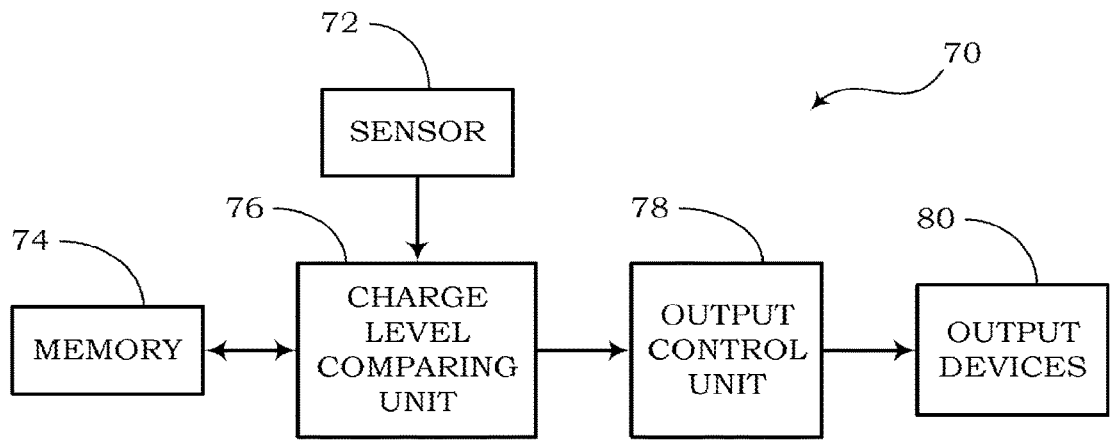
FIG. 5 schematically depicts a block diagram of a charge status indicator according to an embodiment of the present invention.
FIG. 6 schematically depicts a chart showing various illumination patterns of LEDs for indicating the status of a rechargeable power supply according to an embodiment of the present invention.

FIG. 5 is a block diagram illustrating an embodiment of a charge status indicator 60. The charge status indicator 60 of FIG. 5 may represent an embodiment of the charge status indicator 22 incorporated on the wireless electronic device 12 and/or an embodiment of the charge status indicator 32 incorporated on the recharging device 14. According to some embodiments, portions of the charge status indicator 60 may be incorporated in the wireless electronic device 12 while other portions of the charge status indicator 60 may be incorporated in the recharging device 14.

In this embodiment, the charge status indicator 60 includes a sensor 62, memory 64, a charge level comparing unit 66, an output control unit 68, and output devices 70. The sensor 62 may be a charge sensor for sensing the stored charge of the rechargeable power supply. The memory 64 may be configured to store various charge level values. The charge level comparing unit 66 is configured to compare the charge sensed by the sensor 62 with the various charge level values stored in the memory 64.

Based on the comparison made by the charge level comparing unit 66, the charge level comparing unit 66 and/or the output control unit 68 may be configured to determine one of multiple different ranges within which the sensed charge level lies. Once the range is detected, the output control unit 68 is configured to control the output devices 70 to indicate the detected range to the user.

The output devices 70 may include visual and/or audible indicating devices. For example, the output devices 70 may include two LEDs for visually indicating the charge status. In this sense, the output control unit 68 may be configured as a switching control device for switching the LEDs on and off according to predefined patterns. The predefined patterns may include signals that can intuitively communicate various charge status levels to the user. For instance, the output devices 70 may include a first LED having one color (e.g., yellow) and a second LED having another color (e.g., green).

According to one embodiment, the charge status indicator 60 may include a charge sensing device (e.g., sensor 62) configured to sense the charge of a rechargeable power supply. The charge status indicator 60 may further includes a detection device (e.g., charge level comparing unit 66) configured to compare the sensed charge with a plurality of predetermined levels in order to determine one of a plurality of capacity ranges of the rechargeable power supply. The charge status indicator 60 also include the output devices 70, such as a first LED and a second LED. Also, a switching circuit (e.g., output control unit 68) is configured to switch the first and second LEDs on and off using a plurality of predefined illumination (or on/off) patterns to indicate the capacity range of the rechargeable power supply.

Furthermore, the rechargeable power supply may include at least one supercapacitor and may be incorporated in a wireless barcode scanner. The charge status indicator may additionally or alternatively be incorporated in a cradle (e.g., recharging device 14) that is configured to support the wireless barcode scanner during a charging process, wherein the cradle may be further configured to provide electric charge to the wireless barcode scanner during the charging process to recharge the supercapacitor of the wireless barcode scanner.

The plurality of capacity ranges may include a first range designating a "near empty" status, a second range designating a "ready to use" status, a third range designating a "greater than half capacity" status, and a fourth range designating an "at or near full capacity" status. The switching circuit (e.g., output control unit 68) may be configured to switch the first and second LEDs in a first predefined illumination pattern when the charge of the rechargeable power supply falls within the first range, a second predefined illumination pattern when the charge of the rechargeable power supply falls within the second range, a third predefined illumination pattern when the charge of the rechargeable power supply falls within the third range, and a fourth predefined illumination pattern when the charge of the rechargeable power supply falls within the fourth range. For example, the first predefined illumination pattern may include repeating a cycle of switching the first LED on for about 500 ms and off for about 500 ms, the second predefined illumination pattern may include repeating a cycle of switching the second LED on for about 500 ms and off for about 500 ms, the third predefined illumination pattern may include repeating a cycle of switching the second LED on for about 1000 ms and off for about 500 ms, and the fourth predefined illumination pattern may include switching the second LED on indefinitely.

In addition, the switching circuit (e.g., output control unit 68) may be configured to switch the first and second LEDs off when the base charger is not charging the rechargeable power supply or when the handheld electronic device is not properly supported by the base charger. The switching circuit may also be configured to switch at least one of the first and second LEDs in a rapid on/off pattern when the charge sensing device or detection device detects a charging error or a condition in which the charging process has been suspended.

FIG. 6 is a diagram of a chart 80 showing exemplary implementations of illumination or on/off patterns of the output devices 70 for indicating the status of the rechargeable power supply. The chart 80 defines the signals that may be provided by the output control unit 68 (or switching circuit) for controlling the illumination of the output devices 70 (e.g., LEDs). In this embodiment, the indicators or output devices 70 include a first LED (i.e., "LED #1") and a second LED (i.e., "LED #2"). According to other embodiments, the charge status indicator 60 may include additional LEDs (e.g., three or more LEDs).

According to the chart 80 of FIG. 6, the output control unit 68 is configured to switch the LEDs on and off in predefined patterns depending on the detected status. When the wireless electronic device 12 (e.g., barcode scanner) is absent (i.e., not seated in the cradle 16), both LEDs may be off to indicate a "Scanner Absent" status or other "wireless electronic device absent" status. If a charging error is detected, one or both of the LEDs may be switched on and off in a rapid pattern (e.g., 300 ms on and 300 ms off). This on/off cycle is repeated indefinitely until another condition is detected.

The indicators may also indicate a "near empty" status, which may be indicated by a repeating on/off pattern of LED #1 (e.g., yellow LED), such as a pattern of 500 ms on and 500 ms off. The second LED is switched off. The "near empty" indication may represent a condition in which the rechargeable power supply is currently holding a charge at 0% to about 25% full capacity.

A "ready to use" status may be defined by switching LED #2 (e.g., green LED) repeatedly on and off in a signal pattern of 500 ms high (i.e., on) and 500 ms low (i.e., off). The first LED is switched off during this time. The "ready to use" indication may represent a condition in which the rechargeable power supply is currently holding a charge of about 25% to about 50% of full capacity. As an example, when the rechargeable power supply is a supercapacitor and the wireless electronic device is a barcode scanner, the "ready to use" indication may signal to the user that the barcode scanner can be used to scan at least a few barcodes before the rechargeable power supply needs to be recharged further.

A "half capacity" status may be defined by switching LED #1 off and switching LED #2 on and off in a pattern of one second at a high signal (i.e., on) and 500 ms at a low signal (i.e., off). The "half capacity" indication may represent a condition in which the rechargeable power supply is currently holding a charge of about 50% to about 75% of full capacity.

The status of "full capacity" or "near full capacity" may be defined by switching LED #2 on indefinitely and LED #1 is switched off. The "full capacity" indication may represent a condition in which the rechargeable power supply is currently holding a charge of about 75% to 100% of full capacity.

It should be noted that other embodiments may include different output devices 70 or a different number of LEDs. Other embodiments may also include different colors of LEDs and/or different timing signals for switching the LEDs on and off. Also, other embodiments may be used to indicate different ranges of charges with respect to full capacity.

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,165; 9,064,167; 9,064,168; 9,064,254; 9,066,032; 9,070,032; 9,076,459; 9,079,423; 9,080,856; 9,082,023; 9,082,031; 9,084,032; 9,087,250; 9,092,681; 9,092,682; 9,092,683; 9,093,141; 9,098,763; 9,104,929; 9,104,934; 9,107,484; 9,111,159; 9,111,166; 9,135,483; 9,137,009; 9,141,839; 9,147,096; 9,148,474; 9,158,000; 9,158,340; 9,158,953; 9,159,059; 9,165,174; 9,171,543; 9,183,425; 9,189,669; 9,195,844; 9,202,458; 9,208,366; 9,208,367; 9,219,836; 9,224,024; 9,224,027; 9,230,140; 9,235,553; 9,239,950; 9,245,492; 9,248,640; 9,250,652; 9,250,712; 9,251,411; 9,258,033; 9,262,633; 9,262,660; 9,262,662; 9,269,036; 9,270,782; 9,274,812; 9,275,388; 9,277,668; 9,280,693; 9,286,496; 9,298,964; 9,301,427; 9,313,377; 9,317,037; 9,319,548; 9,342,723; 9,361,882; 9,365,381; 9,373,018; 9,375,945; 9,378,403; 9,383,848; 9,384,374; 9,390,304; 9,390,596; 9,411,386; 9,412,242; 9,418,269; 9,418,270; 9,465,967; 9,423,318; 9,424,454; 9,436,860; 9,443,123; 9,443,222; 9,454,689; 9,464,885; 9,465,967; 9,478,983; 9,481,186; 9,487,113; 9,488,986; 9,489,782; 9,490,540; 9,491,729; 9,497,092; 9,507,974; 9,519,814; 9,521,331; 9,530,038; 9,572,901; 9,558,386; 9,606,581; 9,646,189; 9,646,191; 9,652,648; 9,652,653; 9,656,487; 9,659,198; 9,680,282; 9,697,401; 9,701,140; U.S. Design Pat. No. D702,237; U.S. Design Pat. No. D716,285; U.S. Design Pat. No. D723,560; U.S. Design Pat. No. D730,357; U.S. Design Pat. No. D730,901; U.S. Design Pat. No. D730,902; U.S. Design Pat. No. D734,339; U.S. Design Pat. No. D737,321; U.S. Design Pat. No. D754,205; U.S. Design Pat. No. D754,206; U.S. Design Pat. No. D757,009; U.S. Design Pat. No. D760,719; U.S. Design Pat. No. D762,604; U.S. Design Pat. No. D766,244; U.S. Design Pat. No. D777,166; U.S. Design Pat. No. D771,631; U.S. Design Pat. No. D783,601; U.S. Design Pat. No. D785,617; U.S. Design Pat. No. D785,636; U.S. Design Pat. No. D790,505; U.S. Design Pat. No. D790,546; International Publication No. 2013/163789; U.S. Patent Application Publication No. 2008/0185432; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2010/0265880; U.S. Patent Application Publication No. 2011/0202554; U.S. Patent Application Publication No. 2012/0111946; U.S. Patent Application Publication No. 2012/0168511; U.S. Patent Application Publication No. 2012/0168512; U.S. Patent Application Publication No. 2012/0193423; U.S. Patent Application Publication No. 2012/0194692; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0082104; U.S. Patent Application Publication No. 2013/0175341; U.S. Patent Application Publication No. 2013/0175343; U.S. Patent Application Publication No. 2013/0257744; U.S. Patent Application Publication No. 2013/0257759; U.S. Patent Application Publication No. 2013/0270346; U.S. Patent Application Publication No. 2013/0292475; U.S. Patent Application Publication No. 2013/0292477; U.S. Patent Application Publication No. 2013/0293539; U.S. Patent Application Publication No. 2013/0293540; U.S. Patent Application Publication No. 2013/0306728; U.S. Patent Application Publication No. 2013/0306731; U.S. Patent Application Publication No. 2013/0307964; U.S. Patent Application Publication No. 2013/0308625; U.S. Patent Application Publication No. 2013/0313324; U.S. Patent Application Publication No. 2013/0332996; U.S. Patent Application Publication No. 2014/0001267; U.S. Patent
Application Publication No. 2014/0025584; U.S. Patent
Application Publication No. 2014/0034734; U.S. Patent
Application Publication No. 2014/0036848; U.S. Patent
Application Publication No. 2014/0039693; U.S. Patent
Application Publication No. 2014/0049120; U.S. Patent
Application Publication No. 2014/0049635; U.S. Patent
Application Publication No. 2014/0061306; U.S. Patent
Application Publication No. 2014/0063289; U.S. Patent
Application Publication No. 2014/0066136; U.S. Patent
Application Publication No. 2014/0067692; U.S. Patent
Application Publication No. 2014/0070005; U.S. Patent
Application Publication No. 2014/0071840; U.S. Patent
Application Publication No. 2014/0074746; U.S. Patent
Application Publication No. 2014/0076974; U.S. Patent
Application Publication No. 2014/0097249; U.S. Patent
Application Publication No. 2014/0098792; U.S. Patent
Application Publication No. 2014/0100813; U.S. Patent
Application Publication No. 2014/0103115; U.S. Patent
Application Publication No. 2014/0104413; U.S. Patent
Application Publication No. 2014/0104414; U.S. Patent
Application Publication No. 2014/0104416; U.S. Patent
Application Publication No. 2014/0106725; U.S. Patent
Application Publication No. 2014/0108010; U.S. Patent
Application Publication No. 2014/0108402; U.S. Patent
Application Publication No. 2014/0110485; U.S. Patent
Application Publication No. 2014/0125853; U.S. Patent
Application Publication No. 2014/0125999; U.S. Patent
Application Publication No. 2014/0129378; U.S. Patent
Application Publication No. 2014/0131443; U.S. Patent
Application Publication No. 2014/0133379; U.S. Patent
Application Publication No. 2014/0136208; U.S. Patent
Application Publication No. 2014/0140585; U.S. Patent
Application Publication No. 2014/0152882; U.S. Patent
Application Publication No. 2014/0158770; U.S. Patent
Application Publication No. 2014/0159869; U.S. Patent
Application Publication No. 2014/0166759; U.S. Patent
Application Publication No. 2014/0168787; U.S. Patent
Application Publication No. 2014/0175165; U.S. Patent
Application Publication No. 2014/0191684; U.S. Patent
Application Publication No. 2014/0191913; U.S. Patent
Application Publication No. 2014/0197304; U.S. Patent
Application Publication No. 2014/0214631; U.S. Patent
Application Publication No. 2014/0217166; U.S. Patent
Application Publication No. 2014/0231500; U.S. Patent
Application Publication No. 2014/0247315; U.S. Patent
Application Publication No. 2014/0263493; U.S. Patent
Application Publication No. 2014/0263645; U.S. Patent
Application Publication No. 2014/0270196; U.S. Patent
Application Publication No. 2014/0270229; U.S. Patent
Application Publication No. 2014/0278387; U.S. Patent
Application Publication No. 2014/0288933; U.S. Patent
Application Publication No. 2014/0297058; U.S. Patent
Application Publication No. 2014/0299665; U.S. Patent
Application Publication No. 2014/0332590; U.S. Patent
Application Publication No. 2014/0351317; U.S. Patent
Application Publication No. 2014/0362184; U.S. Patent
Application Publication No. 2014/0363015; U.S. Patent
Application Publication No. 2014/0369511; U.S. Patent
Application Publication No. 2014/0374483; U.S. Patent
Application Publication No. 2014/0374485; U.S. Patent
Application Publication No. 2015/0001301; U.S. Patent
Application Publication No. 2015/0001304; U.S. Patent
Application Publication No. 2015/0009338; U.S. Patent
Application Publication No. 2015/0014416; U.S. Patent
Application Publication No. 2015/0021397; U.S. Patent
Application Publication No. 2015/0028104; U.S. Patent
Application Publication No. 2015/0029002; U.S. Patent
Application Publication No. 2015/0032709; U.S. Patent
Application Publication No. 2015/0039309; U.S. Patent
Application Publication No. 2015/0039878; U.S. Patent
Application Publication No. 2015/0040378; U.S. Patent
Application Publication No. 2015/0049347; U.S. Patent
Application Publication No. 2015/0051992; U.S. Patent
Application Publication No. 2015/0053769; U.S. Patent
Application Publication No. 2015/0062366; U.S. Patent
Application Publication No. 2015/0063215; U.S. Patent
Application Publication No. 2015/0088522; U.S. Patent
Application Publication No. 2015/0096872; U.S. Patent
Application Publication No. 2015/0100196; U.S. Patent
Application Publication No. 2015/0102109; U.S. Patent
Application Publication No. 2015/0115035; U.S. Patent
Application Publication No. 2015/0127791; U.S. Patent
Application Publication No. 2015/0128116; U.S. Patent
Application Publication No. 2015/0133047; U.S. Patent
Application Publication No. 2015/0134470; U.S. Patent
Application Publication No. 2015/0136851; U.S. Patent
Application Publication No. 2015/0142492; U.S. Patent
Application Publication No. 2015/0144692; U.S. Patent
Application Publication No. 2015/0144698; U.S. Patent
Application Publication No. 2015/0149946; U.S. Patent
Application Publication No. 2015/0161429; U.S. Patent
Application Publication No. 2015/0178523; U.S. Patent
Application Publication No. 2015/0178537; U.S. Patent
Application Publication No. 2015/0178685; U.S. Patent
Application Publication No. 2015/0181109; U.S. Patent
Application Publication No. 2015/0199957; U.S. Patent
Application Publication No. 2015/0210199; U.S. Patent
Application Publication No. 2015/0212565; U.S. Patent
Application Publication No. 2015/0213647; U.S. Patent
Application Publication No. 2015/0220753; U.S. Patent
Application Publication No. 2015/0220901; U.S. Patent
Application Publication No. 2015/0227189; U.S. Patent
Application Publication No. 2015/0236984; U.S. Patent
Application Publication No. 2015/0239348; U.S. Patent
Application Publication No. 2015/0242658; U.S. Patent
Application Publication No. 2015/0248572; U.S. Patent
Application Publication No. 2015/0254485; U.S. Patent
Application Publication No. 2015/0261643; U.S. Patent
Application Publication No. 2015/0264624; U.S. Patent
Application Publication No. 2015/0268971; U.S. Patent
Application Publication No. 2015/0269402; U.S. Patent
Application Publication No. 2015/0288689; U.S. Patent
Application Publication No. 2015/0288896; U.S. Patent
Application Publication No. 2015/0310243; U.S. Patent
Application Publication No. 2015/0310244; U.S. Patent
Application Publication No. 2015/0310389; U.S. Patent
Application Publication No. 2015/0312780; U.S. Patent
Application Publication No. 2015/0327012; U.S. Patent
Application Publication No. 2016/0014251; U.S. Patent
Application Publication No. 2016/0025697; U.S. Patent
Application Publication No. 2016/0026838; U.S. Patent
Application Publication No. 2016/0026839; U.S. Patent
Application Publication No. 2016/0040982; U.S. Patent
Application Publication No. 2016/0042241; U.S. Patent
Application Publication No. 2016/0057230; U.S. Patent
Application Publication No. 2016/0062473; U.S. Patent
Application Publication No. 2016/0070944; U.S. Patent
Application Publication No. 2016/0092805; U.S. Patent
Application Publication No. 2016/0101936; U.S. Patent
Application Publication No. 2016/0104019; U.S. Patent
Application Publication No. 2016/0104274; U.S. Patent
Application Publication No. 2016/0109219; U.S. Patent
Application Publication No. 2016/0109220; U.S. Patent Application Publication No. 2016/0109224; U.S. Patent Application Publication No. 2016/0112631; U.S. Patent Application Publication No. 2016/0112643; U.S. Patent Application Publication No. 2016/0117627; U.S. Patent Application Publication No. 2016/0124516; U.S. Patent Application Publication No. 2016/0125217; U.S. Patent Application Publication No. 2016/0125342; U.S. Patent Application Publication No. 2016/0125873; U.S. Patent Application Publication No. 2016/0133253; U.S. Patent Application Publication No. 2016/0171597; U.S. Patent Application Publication No. 2016/0171666; U.S. Patent Application Publication No. 2016/0171720; U.S. Patent Application Publication No. 2016/0171775; U.S. Patent Application Publication No. 2016/0171777; U.S. Patent Application Publication No. 2016/0174674; U.S. Patent Application Publication No. 2016/0178479; U.S. Patent Application Publication No. 2016/0178685; U.S. Patent Application Publication No. 2016/0178707; U.S. Patent Application Publication No. 2016/0179132; U.S. Patent Application Publication No. 2016/0179143; U.S. Patent Application Publication No. 2016/0179368; U.S. Patent Application Publication No. 2016/0179378; U.S. Patent Application Publication No. 2016/0180130; U.S. Patent Application Publication No. 2016/0180133; U.S. Patent Application Publication No. 2016/0180136; U.S. Patent Application Publication No. 2016/0180594; U.S. Patent Application Publication No. 2016/0180663; U.S. Patent Application Publication No. 2016/0180678; U.S. Patent Application Publication No. 2016/0180713; U.S. Patent Application Publication No. 2016/0185136; U.S. Patent Application Publication No. 2016/0185291; U.S. Patent Application Publication No. 2016/0186926; U.S. Patent Application Publication No. 2016/0188861; U.S. Patent Application Publication No. 2016/0188939; U.S. Patent Application Publication No. 2016/0188940; U.S. Patent Application Publication No. 2016/0188941; U.S. Patent Application Publication No. 2016/0188942; U.S. Patent Application Publication No. 2016/0188943; U.S. Patent Application Publication No. 2016/0188944; U.S. Patent Application Publication No. 2016/0189076; U.S. Patent Application Publication No. 2016/0189087; U.S. Patent Application Publication No. 2016/0189088; U.S. Patent Application Publication No. 2016/0189092; U.S. Patent Application Publication No. 2016/0189284; U.S. Patent Application Publication No. 2016/0189288; U.S. Patent Application Publication No. 2016/0189366; U.S. Patent Application Publication No. 2016/0189443; U.S. Patent Application Publication No. 2016/0189447; U.S. Patent Application Publication No. 2016/0189489; U.S. Patent Application Publication No. 2016/0192051; U.S. Patent Application Publication No. 2016/0202951; U.S. Patent Application Publication No. 2016/0202958; U.S. Patent Application Publication No. 2016/0202959; U.S. Patent Application Publication No. 2016/0203021; U.S. Patent Application Publication No. 2016/0203429; U.S. Patent Application Publication No. 2016/0203797; U.S. Patent Application Publication No. 2016/0203820; U.S. Patent Application Publication No. 2016/0204623; U.S. Patent Application Publication No. 2016/0204636; U.S. Patent Application Publication No. 2016/0204638; U.S. Patent Application Publication No. 2016/0227912; U.S. Patent Application Publication No. 2016/0232891; U.S. Patent Application Publication No. 2016/0292477; U.S. Patent Application Publication No. 2016/0294779; U.S. Patent Application Publication No. 2016/0306769; U.S. Patent Application Publication No. 2016/0314276; U.S. Patent Application Publication No. 2016/0314294; U.S. Patent Application Publication No. 2016/0316190; U.S. Patent Application Publication No. 2016/0323310; U.S. Patent Application Publication No. 2016/0325677; U.S. Patent Application Publication No. 2016/0327614; U.S. Patent Application Publication No. 2016/0327930; U.S. Patent Application Publication No. 2016/0328762; U.S. Patent Application Publication No. 2016/0330218; U.S. Patent Application Publication No. 2016/0343163; U.S. Patent Application Publication No. 2016/0343176; U.S. Patent Application Publication No. 2016/0364914; U.S. Patent Application Publication No. 2016/0370220; U.S. Patent Application Publication No. 2016/0372282; U.S. Patent Application Publication No. 2016/0373847; U.S. Patent Application Publication No. 2016/0377414; U.S. Patent Application Publication No. 2016/0377417; U.S. Patent Application Publication No. 2017/0010141; U.S. Patent Application Publication No. 2017/0010328; U.S. Patent Application Publication No. 2017/0010780; U.S. Patent Application Publication No. 2017/0016714; U.S. Patent Application Publication No. 2017/0018094; U.S. Patent Application Publication No. 2017/0046603; U.S. Patent Application Publication No. 2017/0047864; U.S. Patent Application Publication No. 2017/0053146; U.S. Patent Application Publication No. 2017/0053147; U.S. Patent Application Publication No. 2017/0053647; U.S. Patent Application Publication No. 2017/0055606; U.S. Patent Application Publication No. 2017/0060316; U.S. Patent Application Publication No. 2017/0061961; U.S. Patent Application Publication No. 2017/0064634; U.S. Patent Application Publication No. 2017/0083730; U.S. Patent Application Publication No. 2017/0091502; U.S. Patent Application Publication No. 2017/0091706; U.S. Patent Application Publication No. 2017/0091741; U.S. Patent Application Publication No. 2017/0091904; U.S. Patent Application Publication No. 2017/0092908; U.S. Patent Application Publication No. 2017/0094238; U.S. Patent Application Publication No. 2017/0098947; U.S. Patent Application Publication No. 2017/0100949; U.S. Patent Application Publication No. 2017/0108838; U.S. Patent Application Publication No. 2017/0108895; U.S. Patent Application Publication No. 2017/0118355; U.S. Patent Application Publication No. 2017/0123598; U.S. Patent Application Publication No. 2017/0124369; U.S. Patent Application Publication No. 2017/0124396; U.S. Patent Application Publication No. 2017/0124687; U.S. Patent Application Publication No. 2017/0126873; U.S. Patent Application Publication No. 2017/0126904; U.S. Patent Application Publication No. 2017/0139012; U.S. Patent Application Publication No. 2017/0140329; U.S. Patent Application Publication No. 2017/0140731; U.S. Patent Application Publication No. 2017/0147847; U.S. Patent Application Publication No. 2017/0150124; U.S. Patent Application Publication No. 2017/0169198; U.S. Patent Application Publication No. 2017/0171035; U.S. Patent Application Publication No. 2017/0171703; U.S. Patent Application Publication No. 2017/0171803; U.S. Patent Application Publication No. 2017/0180359; U.S. Patent Application Publication No. 2017/0180577; U.S. Patent Application Publication No. 2017/0181299; U.S. Patent Application Publication No. 2017/0190192; U.S. Patent Application Publication No. 2017/0193432; U.S. Patent Application Publication No. 2017/0193461; U.S. Patent Application Publication No. 2017/0193727; U.S. Patent Application Publication No. 2017/0199266; U.S. Patent Application Publication No. 2017/0200108; and U.S. Patent Application Publication No. 2017/0200275.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method comprising:
   sensing, by a charge sensor in a handheld electronic device, a charge of a rechargeable power supply in the handheld electronic device;
   determining, by a charge level comparing unit in the handheld electronic device, whether the handheld electronic device is able to perform a function based on a comparison of the charge of the rechargeable power supply and a predetermined charge level; and
   in response to determining that the handheld electronic device is able to perform the function, generating an illumination pattern of a plurality of illumination patterns by switching a plurality of LEDs to indicate that the handheld electronic device is able to perform the function before the rechargeable power supply needs to be recharged further, wherein the plurality of LEDs is incorporated into (1) the handheld electronic device and (2) a base charger configured to support the handheld electronic device.

2. The method of claim 1, wherein at least one of the plurality of illumination patterns indicates a "ready to use" status by switching at least one LED of the plurality of LEDs repeatedly on and off in a signal pattern of high and low.

3. The method of claim 1, wherein switching the plurality of LEDs comprises switching, by a switching circuit, one or more LEDs for one or more timing signals.

4. The method of claim 1, further comprising:
   detecting at least one of a charging error and a condition in which charging has been suspended, by at least the charge sensor and a detection device in the handheld electronic device; and
   switching at least one LED of the plurality of LEDs in a rapid on/off pattern.

5. The method of claim 1, further comprising:
   switching, by a switching circuit, a first LED and a second LED of the plurality of LEDs according to a first illumination pattern when the charge of the rechargeable power supply falls within a first range;
   switching, by the switching circuit, the first LED and the second LED according to a second illumination pattern when the charge of the rechargeable power supply falls within a second range;
   switching, by the switching circuit, the first LED and the second LED according to a third predefined illumination pattern when the charge of the rechargeable power supply falls within a third range; and
   switching, by the switching circuit, the first LED and the second LED according to a fourth predefined illumination pattern when the charge of the rechargeable power supply falls within a fourth range.

6. The method of claim 5, wherein switching the first LED on for about 500 ms and off for about 500 ms by repeating a cycle of switching as the first illumination pattern;
   switching the second LED on for about 500 ms and off for about 500 ms by repeating a cycle of switching as the second illumination pattern;
   switching the second LED on for about 1000 ms and off for about 500 ms by repeating a cycle of switching as the third illumination pattern; and
   switching the second LED on as the fourth illumination pattern.

7. The method of claim 1, wherein designating, a "near empty" status, a "ready to use" status, a "greater than half capacity" status, and an "at or near full capacity" status as a first, second, third and fourth range respectively of a plurality of capacity ranges.

8. The method of claim 1, wherein the illumination pattern indicates a "near empty" status by a condition in which the rechargeable power supply is currently holding a charge at 0% to about 25% full capacity.

9. The method of claim 1, wherein the illumination pattern indicates a "ready to use" status by a condition in which the rechargeable power supply is currently holding a charge of about 25% to about 50% of full capacity.

10. The method of claim 1, wherein the illumination pattern indicates a "half capacity" status by a condition in which the rechargeable power supply is currently holding a charge of about 50% to about 75% of full capacity.

11. The method of claim 1, wherein the illumination pattern indicates a status of "full capacity" or "near full capacity" by a condition in which the rechargeable power supply is currently holding a charge of about 75% to 100% of full capacity.

12. A charge status indicator incorporated in a handheld electronic device, comprising:
    a charge sensing device configured to sense a charge of a rechargeable power supply incorporated in the handheld electronic device;
    a comparing device configured to determine whether the handheld electronic device is able to perform a function based on a comparison of the sensed charge and a predetermined charge level; and
    a switching circuit configured to, in response to a determination that the handheld electronic device is able to perform the function, switch a plurality of LEDs on and off using an illumination pattern of a plurality of illumination patterns to indicate a that the handheld electronic device is able to perform the function before the rechargeable power supply needs to be recharged further,
    wherein the plurality of LEDs is incorporated into (1) the handheld electronic device and (2) a base charger configured to support the handheld electronic device.

13. The charge status indicator of claim 12, wherein the switching circuit is configured to indicate a plurality of capacity ranges comprising a first range designating a "near empty" status, a second range designating a "ready to use" status, a third range designating a "greater than half capacity" status, and a fourth range designating an "at or near full capacity" status.

14. The charge status indicator of claim 12, wherein the rechargeable power supply is recharged when the handheld electronic device is placed on the base charger, and wherein the switching circuit is configured to switch the at least one LED of the plurality of LEDs off when the base charger is not charging the rechargeable power supply or when the handheld electronic device is not properly supported by a charging cradle.

15. The charge status indicator of claim 12, wherein the switching circuit, in response to detecting a charging error, is configured to switch at least one LED of the plurality of LEDs on and off in a rapid pattern, wherein the rapid pattern is repeated indefinitely until another condition is detected.

16. The charge status indicator of claim 12, wherein the switching circuit is configured to switch at least one LED of the plurality of LEDs on and off for different timing signals.

17. The charge status indicator of claim 12, wherein at least one LED of the plurality of LEDs indicates different ranges of charge with respect to "full capacity" status.

18. The charge status indicator of claim 12, wherein the charge status indicator includes a button of an opaque or semi-opaque material through which light from one or more LEDs diffuses.

19. The button according to claim 18, wherein the button includes LEDs of different colors underneath the opaque or semi-opaque material such that a user perceives a color change of one or more LEDs of the LEDs and does not notice a change in location of the one or more LEDs underneath the opaque or semi-opaque material.

20. The charge status indicator according to claim 12, wherein a memory is configured to store various charge level values.

\* \* \* \* \*